May 19, 1970

W. H. LICHFIELD 3,513,051

METHOD OF APPLYING LINERS WITH A PROTECTIVE
COVER TO ROCKET MOTOR CASINGS

Filed March 14, 1966

INVENTOR.
WILLIAM H. LICHFIELD

BY Edwin D. Grant

ATTORNEY

May 19, 1970    W. H. LICHFIELD    3,513,051
METHOD OF APPLYING LINERS WITH A PROTECTIVE
COVER TO ROCKET MOTOR CASINGS

Filed March 14, 1966      2 Sheets-Sheet 2

*INVENTOR.*
WILLIAM H. LICHFIELD

BY *Edwin D. Grant*

ATTORNEY

United States Patent Office 3,513,051
Patented May 19, 1970

3,513,051
METHOD OF APPLYING LINERS WITH A PROTECTIVE COVER, TO ROCKET MOTOR CASINGS
William H. Lichfield, Corinne, Utah, assignor, by mesne assignments, to the United States of America as represented by the Secretary of the Air Force
Filed Mar. 14, 1966, Ser. No. 533,893
Int. Cl. B29c 17/08; B32b 31/04, 31/12
U.S. Cl. 156—242                    11 Claims

ABSTRACT OF THE DISCLOSURE

A method for forming and applying a liner having a protective cover to a rocket motor casing wherein a mold is employed where the outer surface of which conforms to and in a spaced interfit to the surface of a rocket motor casing, such mold surface encased with a bleeder cloth and covered with an impervious flexible sheet which is sealed to the mold surface and the air is evacuated from the space between the flexible sheet and mold surface through an air passage whereupon the uncured liner material is spread over the sheet in a plastic condition, shaped and cured to a thickness to interfit, and positioned adjacent to, the surface of the rocket motor casing, after which the liner and the flexible sheet is pressurized against said casing, whereupon the seal is then broken and the mold surface and bleeder cloth are then removed.

---

This invention relates to rocket motors and more particularly to an improved method of applying a liner to the inner surface of a rocket motor casing.

The inner surface of a solid propellant rocket motor casing is generally coated with a heat-resistant bonding material, usually referred to as "liner material" or simply "liner." This liner provides a stronger bond between a solid propellant grain and a motor casing than can be attained when such a grain is placed in direct contact with the wall of a motor casing, prevents burning of a solid propellant grain at the grain-casing interface, and provides insulation between a grain and the motor casing in which it is held. Heretofore it has been customary to apply this liner to the inner surface of a rocket motor casing when it is in an uncured state, either by hand trowelling or by mechanical means, and thereafter to cure the liner in situ. However, difficulties have been encountered in the use of such prior art methods, particularly with respect to their inability to provide a liner having uniform thickness and continuity.

Accordingly, it is a primary object of this invention to provide an improved method of applying a liner having a protective cover to the inner surface of a rocket motor casing whereby drying and contamination is inhibited.

Another object of this invention is to provide a method of applying a liner having a protective cover of uniform thickness to the inner surface of a rocket motor casing.

Still another object of this invention is to provide a more convenient method of applying a liner having a protective cover to the inner surface of a rocket motor casing.

The above and other objects are achieved by methods in accordance with the present invention, in each of which a liner is formed and at least partially cured on a mold surface having the form of the inner surface interfit the rocket motor casing that is to be lined, after which the shaped liner can conveniently be inspected and then placed within the rocket motor casing.

The invention will be described in detail in the following specification, in which reference is made to the accompanying drawings wherein.

Throughout the specification and drawing, the same reference numbers refer to the same parts.

Figures 1, 2:
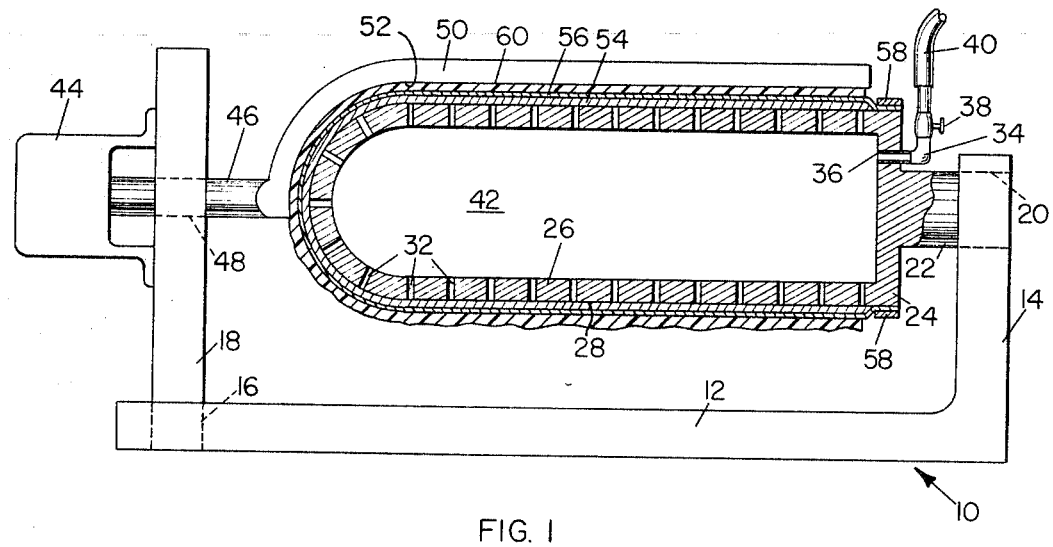
FIG. 1 is a diagrammatic representation of apparatus that can be used in forming rocket motor liners by methods in accordance with the invention and for installing the liner in the rocket motor casing.
FIG. 2 is a longitudinal sectional view of another apparatus that can be used in installing a liner that is formed by methods in accordance with the invention.

Initial steps of a preferred method of applying a liner having a protective cover within a rocket motor casing in accordance with the invention can be accomplished by means of the apparatus illustrated in FIG. 1, in which reference number 10 generally designates a stand or support member comprising a base 12 on one end of which is a fixed, vertically disposed support arm 14. The other end of base 10 is formed with a hole 16 in which one end of a second vertically disposed support arm 18 is removably positioned. Support arm 14 is also formed with a hole 20 adjacent its free end, in which hole is removably positioned a shaft 22 that projects from the end wall 24 of a mold shell 26. The outer or mold surface 28 of mold shell 26 has a spaced interfit with the form of the inner surface of a rocket motor casing 30 (see FIG. 2), but the diameter of mold shell 26 and the radius of curvature of its rounded end are respectively slightly less than the inside diameter and the radius of curvature of the inner, forward end surface of said rocket motor. A plurality of perforations 32 extend through mold shell 26 and are spaced over mold surface 28 thereof, and a conduit 34 is fixedly engaged within an aperture 36 in end wall 24 of said mold shell. Conduit 34 is provided with a flow control valve 38 and is connected by means of a hose 40 to a pump (not shown) that can be operated to evacuate and pressurize the interior 42 of mold shell 26. Fixedly mounted on support arm 18 is an electric motor 44 the drive shaft 46 of which extends through an aperture 48 in said support arm and is connected to one end of a template 50. The inner edge 52 of template 50 is evenly spaced from mold surface 28 of mold shell 26.

In one method of forming a rocket motor liner in accordance with the invention, a bleeder cloth 54 is placed or encased over the mold surface 28 of mold shell 26, and this bleeder cloth is than covered with a continuous, flexible and impervious sheet 56 formed of a polymeric material such as polyethylene. Bleeder cloth 54 may be made of any suitable material having interstices through which air can flow to move from any point on mold surface 28 of mold shell 26 to the perforations 32 therein. A clamp ring 58 or other suitable means is next placed around the fixed end of mold shell 26 and over a portion of sheet 56 that extends beyond the adjacent end of bleeder cloth 54, thereby sealing the space between said sheet and mold surface 28 of mold shell 26. The pump connected to hose 40 is then operated to evacuate air from the interior 42 of mold shell 26 and to thereby hold sheet 56 against bleeder cloth 54 and on mold surface 28.

After mold surface 28 has been covered as described immediately hereinbefore, a layer 60 of liner material (which can be any one of uncured the many different liner materials that are known in the art) is spread in a plastic condition over the outer surface of the sheet 56 disposed over bleeder cloth 54, and motor 44 is operated to thereby revolve template 50 around mold shell 26 and sweep layer 60 to uniform thickness. One example of a liner material which can be employed has the following composition: carboxyl-terminated polybutadiene polymer, 83.0% by weight; tris 1-(2-methyl)aziridinyl phosphine oxide, 2.4% by weight; trifunctional epoxy resin, 1.6% by weigth;

asbestos floats 10.0% by weight; iron octoate, 1.0% by weight; and tri-glyceride of hydroxy stearic acid, 2.0% by weight. The liner material is then cured in situ to a cure stage wherein it is rigid or semi-rigid, after which the inner surface of rocket motor casing 30 may be positioned adjacent in an interfit relation to layer 60 of said liner material whereupon the vacuum in mold shell is released and the both layer 60 and sheet 56 may be pressurized to press against the rocket motor casing 30. In some instances such pressurization may be accomplished by releasing the vacuum holding said flexible and impervious sheet against said bleeder cloth encased mold surface. At this point, if the condition of the liner is semi-rigid the curing of said liner material may be completed. The clamp ring 58 or other suitable means is released from the mold shell 26 thus breaking the sealed space and the mold surface and bleeder cloth are then removed from layer 60 and flexible sheet 56 which become the liner 60 and protective cover 56 of the rocket motor casing 30.

In another technique of this invention the liner material is then cured in situ to a cured stage where it is semi-rigid, after which the vacuum in mold shell 26 is released and both layer 60 and sheet 56 are simultaneously removed from mold surface 28. Layer 60 can then conveniently be inspected to ensure that it has continuity, uniform thickness, etc.

A large number of small holes are next formed in layer 60 and the sheet 56 positioned against one surface thereof (i.e., each hole is formed in both layer 60 and sheet 56 so to provide a continuous passage through both said layer and sheet), these holes being spaced over the entire surface of layer 60. A spiked wheel can advantageously be used in carrying out this step of the described method of forming a rocket motor liner, after which the outer surface of layer 60 is placed against the inner surface of the rocket motor casing 30 (see FIG. 2) in which the liner is to be installed. Preferably the outer surface of layer 60 is coated with a suitable sealant (which may be the same composition described thereinbefore for layer 60) before the layer is positioned within casing 30. In some instances, however, the use of such a sealant will not be necessary. A bleeder cloth 62, formed of the same material as bleeder cloth 54, is placed against the inner surface of sheet 56, and an air-impervious container 64, inflatable bladder or vamuum bag, is installed within said bleeder cloth 62. A seal ring 66 is next installed within the end of casing 30 as illustrated in FIG. 2, this seal ring having formed therein an aperture 68 through which a conduit 70 extends. The end portion of container 64 is tightly pressed against the inner surface of seal ring 66 by means of a clamp ring 72 to thereby seal the space 74 between container 64 and casing 30. Next and end closure 76 is engaged with the aft end of casing 30 to thereby seal the interior 86 of container 64, conduit 70 and a second conduit 80 being respectively positioned within two apertures 82, 84 formed in said end closure. A pump (not shown) connected to conduit 70 is then operated to evacuate air from space 74, and another pump (not shown) connected to conduit 80 is operated to force air into the interior 86 of container 64 and thereby press layer 60 firmly against the inner surface of casing 30. Air trapped between layer 60 and casing 30, as well as excess sealant disposed therebetween, is drawn through the aforedescribed holes in said layer and sheet 56 by the suction applied to conduit 70. Cure of layer 60 can be completed while the interior 86 of container 64 is pressurized, and sheet 56 can then be removed so that a grain can be cast within the lined casing. If the casting operation cannot be performed immediately, sheet 56 can be left on the surface of the liner to prevent its drying or contamination.

Figure 3:
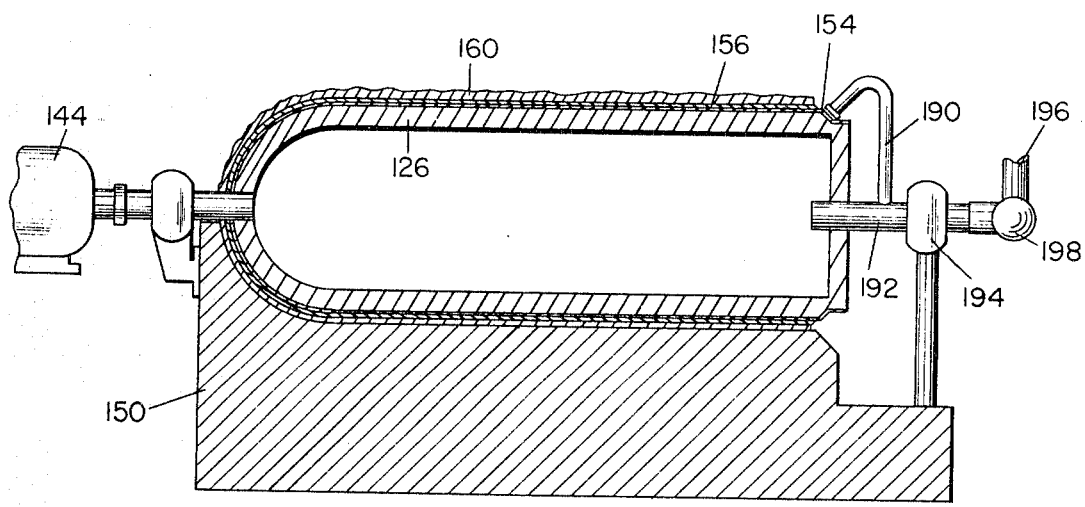
FIG. 3 is a diagrammatical representation of apparatus that can be used in another method of forming rocket motor liners in accordance with the invention.

FIG. 3 illustrates another preferred embodiment of the invention comprising a stationary template 150, a mold shell 126 mounted for rotation about its longitudinal axis by an electric motor 144, and a flexible sheet 156 placed over a porous bleeder cloth 154 which covers the outer surface of said mold shell. It will be noted that mold shell 126 is not provided with performations 32 as is the mold shell 26 illustrated in FIG 1. Sheet 156 is held against bleeder cloth 154, in this embodiment of the invention, by apparatus comprising an evacuation tube 190 one end of which is bonded to said sheet and in communication with an aperture therein, and the other end of which is connected to a hollow shaft 192 mounted on one end of mold shell 126 and rotatably positioned in a bearing 194. A hose 196 is connected to the free end of shaft 192 by means of a swivel joint 198, and this hose is also connected to a pump (not shown) that can be operated to thereby remove air from the space between sheet 156 and the outer surface of mold shell 126 (the ends of said sheet 156 being sealed to said mold shell by means of tape or other suitable means) and to thereby hold sheet 156 against bleeder cloth 154. After sheet 156 has been covered with a layer 160 of liner material, motor 144 is operated to revolve mold shell 126 past the stationary template 150, the edge of which is spaced from sheet 156 to provide the required thickness of said layer 160. Layer 160 can then be installed in a rocket motor casing by the steps described hereinbefore. The hole at the forward end of layer 160 provides an opening for a igniter in the rocket motor in which the liner is used.

The liner-forming methods that have been described can be varied with respect to certain steps thereof without departing from the principles of the invention. For example, the mold surface on which the bleeder cloth and flexible sheet are placed can be on the inside of a mold shell rather than on the outside as described and illustrated. Furthermore, in some applications of the invention the flexible outer sheet can be placed directly against the mold surface of a mold shell on which the layer of liner material is to be formed. It is also possible to leave the bleeder cloth, flexible sheet and layer of liner material on a mold shell while the outer surface of said layer is being positioned against the inner surface of a rocket motor casing. Obviously, the manner in which the layer of liner material is shaped to uniform thickness is not limited to the use of a template, and in some instances the layer can be partially cured on a mold shell, the mold shell mounted on a lathe, and excess liner material removed from the layer with a cutting tool. Still another method of placing the layer on a mold shell in uniform thickness is to apply the liner material to the flexible outer sheet while the mold shell is being rotated. Thus it will be recognized that the specific process steps that have been described are illustrative only and are not to be construed as limiting the scope of the invention, which is set forth in the appended claims.

What is claimed is:

1. A method of forming and applying a liner with a protective cover to a rocket motor casing comprising the steps of:
   (a) encasing a mold surface with a bleeder cloth, said mold surface having a shape corresponding to the inside surface of the rocket motor casing;
   (b) covering the said bleeder cloth encased mold surface with an impervious flexible sheet, said sheet serving as a removable protective cover for the liner;
   (c) sealing said covering sheet to said mold surface;
   (d) evacuating air through said bleeder cloth and through holes in said mold surface to assist in holding said covering sheet on said bleeder cloth encased mold surface;
   (e) applying a layer of plastic, uncured liner material to said covering sheet being held to said bleeder cloth encased mold surface;
   (f) shaping said layer to a thickness to interfit with the surface of the rocket motor casing;
   (g) curing said shaped layer of uncured liner material;

(h) positioning said shaped layer adjacent to the surface of the rocket motor casing;
(i) pressurizing the said shaped layer and said covering sheet against the surface of said rocket motor casing through said holes and said bleeder cloth;
(j) breaking said seal between said covering sheet and said mold surface; and
(k) removing said bleeder cloth and mold surface from the formed assembly of a rocket motor casing with a liner having a protective cover.

2. The method of claim 1 wherein said curing of said layer of plastic, uncured liner material occurs prior to the shaping of said layer.

3. The method of claim 1 wherein the said curing step is partially completed to where the applied layer of liner material acquires a semi-rigid condition and the curing step is completed during pressurizing said layer of liner material and said covering sheet against the surface of the rocket motor casing.

4. The method of claim 3 having an additional step of:
(l) coating the said layer with a sealant prior to the positioning step.

5. The method of claim 4 wherein the sealant is a thin application of uncured liner material.

6. The method recited in claim 3 wherein the curing step is partially completed prior to the shaping step.

7. The method recited in claim 6 having an additional step of:
(l) coating the said layer with a sealant prior to the positioning step.

8. The method recited in claim 7 wherein the sealant is a thin application of uncured liner material.

9. The method of claim 1 wherein the step of breaking the seal occurs after the curing step and the following steps are added:
(l) removing the shaped layer and covering sheet from the bleeder cloth and the mold surface;
(m) inspecting the formed liner and protective cover for defects and if not defective;
(n) inserting an inflatable bladder next to the protective cover, then positioning the assembly with the liner adjacent to the surface of the rocket motor casing as recited; pressurizing the liner and protective cover against the surface of the rocket motor casing through inflation of said inflatable bladder, then removing said inflatable bladder from the formed assembly of a rocket motor casing with a liner having a protective cover.

10. The method of claim 1 wherein the step of breaking the seal occurs after the curing step and the following steps are added:
(l) removing the shaped layer and covering sheet from the bleeder cloth and mold surface;
(m) inspecting the formed liner and protective cover for defects and if not defective;
(n) perforating the liner and protective cover with numerous and equally spaced small air transmitting holes;
(o) installing another bleeder cloth adjacent said protective cover;
(p) inserting an inflatable bladder next to said bleeder cloth, then positioning this assembly with the liner adjacent the surface of the rocket motor casing;
(q) sealing the space between said inflatable bladder and said rocket motor casing and an air passage;
(r) evacuating air through said perforated air holes, bleeder cloth and air passage; then
(s) inflating said inflatable bladder thus pressurizing the liner and protective cover against the surface of the rocket motor casing; then breaking the second seal and removing said another bleeder cloth and inflatable bladder from the formed assembly of a rocket motor casing with a liner having a protective cover.

11. The method recited in claim 10 wherein the curing step is partially completed to where the applied layer of liner material acquires a semi-rigid condition and having an additional step of:
(t) coating the semi-rigid liner with a sealant prior to the step of positioning the liner adjacent the surface of the rocket motor casing; and wherein the curing step is after the inflating step whereby the inflatable bladder pressurizes the liner and protective cover against said rocket motor casing.

References Cited

UNITED STATES PATENTS

| | | | |
|---|---|---|---|
| 2,440,725 | 5/1948 | Munger | 156—286 |
| 2,648,619 | 8/1953 | Alderfer | 156—246 XR |
| 2,842,473 | 7/1958 | Oberly et al. | 156—246 |
| 3,384,923 | 5/1968 | Rownd et al. | 264—94 XR |
| 2,877,504 | 5/1959 | Fox | 86—1 XR |
| 3,056,171 | 10/1962 | Fite | 86—1 XR |
| 3,144,829 | 8/1964 | Fox | 86—1 XR |
| 3,184,362 | 5/1965 | Litsky et al. | 156—423 |
| 3,196,735 | 7/1965 | Baldwin | 86—1 |
| 3,243,956 | 4/1966 | Hamm et al. | 86—1 XR |
| 3,311,013 | 3/1967 | Phipps | 86—1 XR |
| 2,802,240 | 8/1957 | Thomas | 181—48 |

FOREIGN PATENTS

| | | |
|---|---|---|
| 142,563 | 7/1951 | Australia. |
| 570,868 | 12/1957 | Italy. |
| 989,847 | 4/1965 | Great Britain. |

JOHN T. GOOLKASIAN, Primary Examiner

G. W. MOXON II, Assistant Examiner

U.S. Cl. X.R.

86—1; 156—153, 249, 286, 287, 289, 293, 423, 245